UNITED STATES PATENT OFFICE.

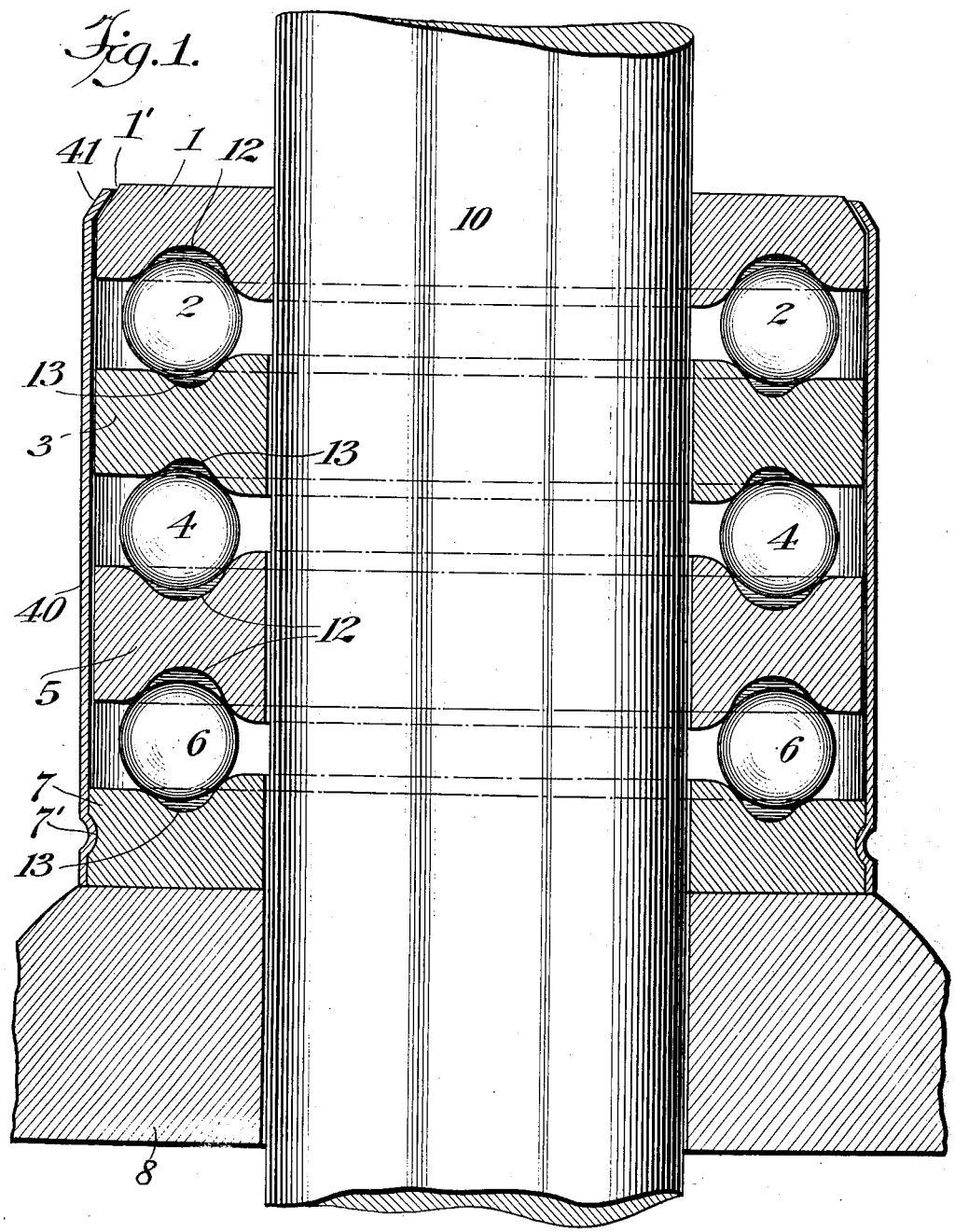

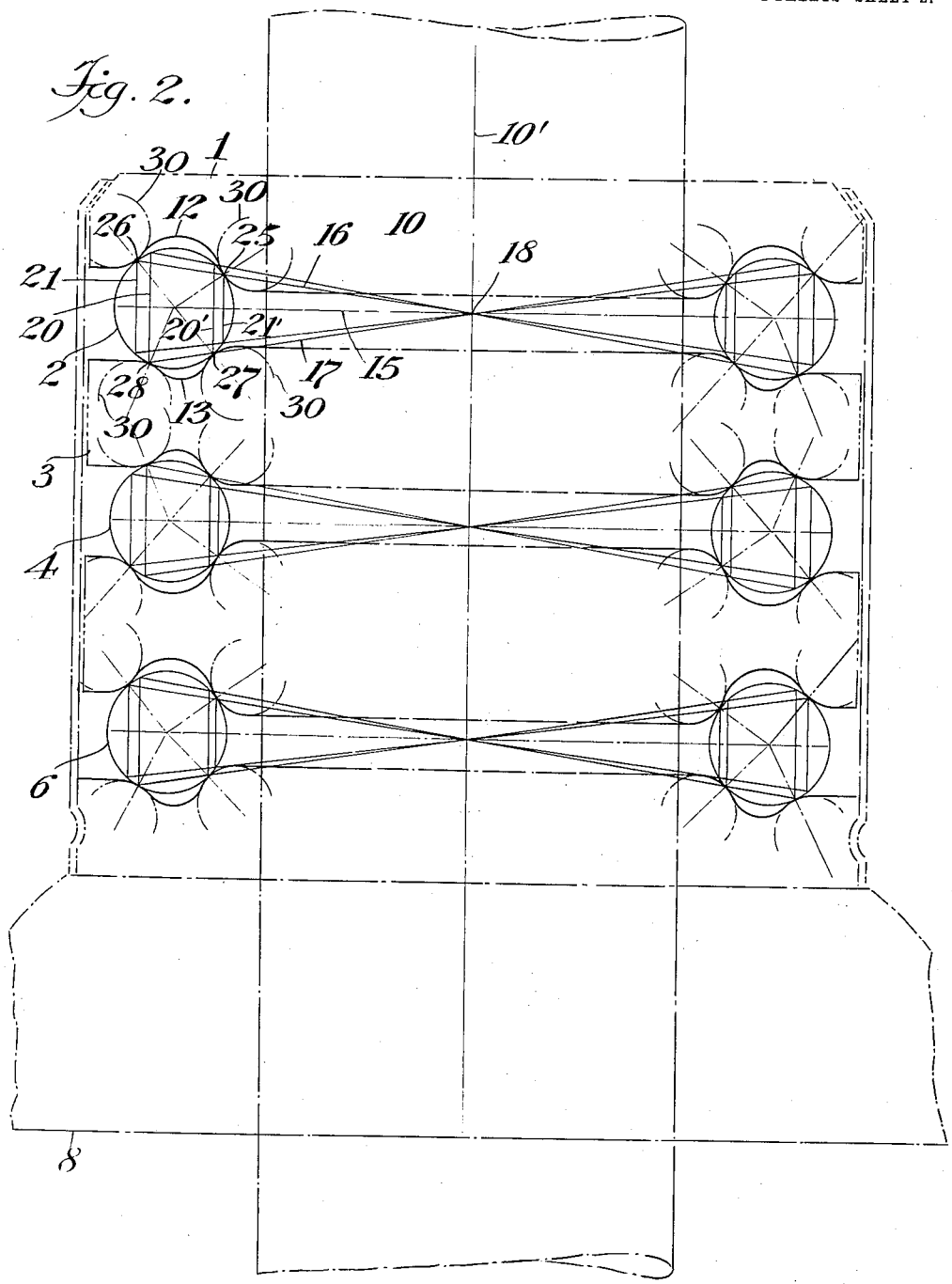

HENRY LA CASSE, OF AUBURN, NEW YORK.

BALL-BEARING.

932,144.  Specification of Letters Patent.  Patented Aug. 24, 1909.

Application filed March 28, 1904. Serial No. 200,225.

*To all whom it may concern:*

Be it known that I, HENRY LA CASSE, a citizen of the United States, and resident of Auburn, in the county of Cayuga and State of New York, have invented certain new and useful Improvements in Ball-Bearings, of which the following is a specification.

This invention relates to improvements in ball bearings and particularly to ball bearings of that type in which the balls and their bearings are so combined as to permit the balls to revolve freely between the bearing surfaces with which they are in contact without having any sliding movement with respect to such surfaces.

As to one of the features thereof, my present invention is in the nature of an improvement upon that shown, described and claimed in Patent No. 518,321, granted to me April 17, 1894. In that patent there is illustrated an antifriction ball bearing having the general characteristics just mentioned, that is to say, a bearing in which the balls and bearing surfaces are so combined that the balls revolve freely on such bearing surfaces without sliding. In my prior patent this result was accomplished by providing bearing faces which made contact with the balls at points in the face of a single imaginary cone having its vertex in the common axis of the bearing members between which the balls were located. This construction provided a four-point bearing for each ball, but the points at which the balls were supported, or made contact with, one bearing member, were directly opposite corresponding points of contact in the other bearing member, the four bearing points of the balls thus being located in two planes parallel with each other. It has been found in practice that such a bearing permits perfect rolling of the balls in the manner just described, without sliding on the bearing surfaces in which they make contact; but it is well known that balls are not made which will withstand as high pressures as the bearing surfaces or ball races with which they make contact, and it has been found that even the best of balls, rolling in the most perfect manner and not sliding at all with respect to the faces of the bearing members or ball races, tend to, and do, elongate somewhat when working at extreme speeds and high pressures. I have also found that this tendency may be very greatly reduced and the life of the ball greatly prolonged by so combining the balls and their coöperative bearing surfaces as to increase the number of planes in which the bearing points of the balls are located, and this I do by so constructing the bearing surfaces or ball races of the bearing members that the points at which each ball makes contact with such bearing faces are in the faces of two imaginary cones having a common vertex in the common axis about which one of the bearing members rotates relatively to the other.

As to another feature thereof, my present invention has for its object the increase in the capacity of ball-bearings in general, and of that type in particular which is shown in said prior patent. There is a limit to the work which is capable of being done by any given ball bearing, and especially to the speed at which one bearing member is capable of rotating on a circuit of balls rolling between it and a coöperative bearing member without sliding contact between the bearing surfaces. Because of this it has been impossible heretofore to operate ball bearings at the highest speeds and maintain the proper rolling action of the balls. I have found, however, that the highest speeds may be attained with properly rolling balls by providing a multiple thrust-bearing having a plurality of circuits of balls and dividing the work to be done in such a manner that each circuit will do a part only of the work, and the relative movement between the bearing surfaces in contact with the balls of the circuit will be well within the limit of speed thereof, the sum of these relative movements, however, being far beyond the limit of a single ball bearing, that is, a bearing having a single circuit of balls, and representing the highest attainable or desired speed. This result I accomplish by providing a multiple thrust-bearing in which three or more bearing members are separated by circuits of balls, two or more of these bearing members being rotatable on these balls at different speeds with respect to the only other bearing member of the series when the bearing is under the influence of an applied speed which exceeds the capacity of a single ball bearing.

Other features of my invention not hereinbefore referred to will be hereinafter described and claimed and are illustrated in the accompanying drawings, in which—

Figure 1 is a central longitudinal section of a vertical thrust-bearing illustrating one embodiment of the various features of my present invention. Fig. 2 is a diagrammatic view of the same illustrating the theory of the rolling movements of the balls and the balancing of certain thrusts in said bearing.

Similar characters designate like parts in the different figures of the drawings.

While I have illustrated herein a vertical thrust-bearing my invention is not, as to any of the features thereof, limited to such a type of bearing, nor is it, as to the first feature thereof hereinbefore referred to, limited to a multiple thrust-bearing, but as to such feature is embodied in any single ball bearing having the characteristics hereinbefore mentioned and which will be hereinafter set forth in detail, said multiple thrust-bearing being illustrated because it shows certain specific subject matter to be claimed in addition to the principal generic features of the invention.

For the purpose of setting forth clearly the essential features of a single ball bearing embodying the principal points of advantage of such bearing as compared with the bearing shown in my aforesaid prior patent, a single element of the multiple bearing shown will first be described. As a matter of convenience the first element of the multiple bearing will be considered. This element or single ball bearing embodies two bearing members with an interposed circuit or row of balls. The bearing members of this first set are designated respectively by 1 and 3, and the balls by 2. These two bearing members, as shown, are superposed and are mounted about a common axis which in the present case is in a shaft 10 to which the bearing member 1 is secured, so as to be fixed with respect thereto while capable of rotating relatively to the second bearing member 3. The bearing faces of the bearing members 1 and 3 may be formed in any suitable manner, preferably by grooving the faces of the bearing members, as shown at 12 and 13, to form ball races which are adapted to make contact with the balls 2 at points in the faces of two imaginary cones which have their common vertex in the common axis 10' of the bearing members 1 and 3. This common axis of the two imaginary cones is indicated at 15, and the faces of such cones are shown by the lines 16 and 17. These cones preferably have not only a common vertex in the axis 10', which vertex is indicated at 18, but they also have a common longitudinal axis, and this axis in the construction shown is perpendicular to the axis 10'. For this reason the bases of these imaginary cones, which bases are indicated at 20 and 21, are concentric with each other.

It will be evident that any bearing face or faces of the bearing members 1 and 3 which is or are in the face of either of the cones will coöperate properly with a ball or balls in contact with such bearing face or faces, so that each ball will roll in contact with such bearing face or faces, in the same manner as would a conical bearing member having a conical face such as is indicated by either of the lines 16 and 17 representing the imaginary cones. Each ball should roll in contact with at least two bearing faces in one of the bearing members, and preferably will roll in contact with two bearing faces in each bearing member, and these bearing faces will be located in more than two planes passing through the axis of the imaginary cone, said points in the construction illustrated being located in four parallel planes.

Referring more particularly to Fig. 2, the bearing points or surfaces of the bearing member 1 with which each ball 2 makes contact are designated respectively 25 and 26 and the points or faces of the bearing member 3 with which said ball makes contact are designated respectively 27 and 28, the planes in which these four points of the ball bearing are located with respect to the axis 15 of the two imaginary cones being designated by the numerals 20, 21, 20' and 21'. From this view it will be clear that there are no bearing points in the bearing member 3 corresponding to the bearing points 25 and 26 of the bearing member 1, as is the case in my aforesaid patent, and also that there are no bearing points in the bearing member 1 corresponding to the bearing points 27 and 28 of the bearing member 3, but that the four bearing points for each ball are all located in different planes though, as in my aforesaid patent, each is in the face of an imaginary cone the vertex of which is in the axis 10' of the bearing. By combining the balls and the contacting faces or points of the bearing members in this manner the ball is supported in a greater number of parallel planes than in my aforesaid patent and the thrust of the load is distributed over a greater area by being applied at four bearing points located in the faces of two imaginary cones.

In order to obtain the most perfect rolling action, the points of contact of each ball should be in arcs tangent to the lines or arcs defining the coacting bearing faces of the bearing members, as illustrated in Fig. 2, from which it will be seen that the bearing faces of the grooves or ball-races 12 and 13 are defined by arcs such as 30, all of which are tangent to the circumference of the ball. This construction also has the advantage, as does that illustrated in my aforesaid patent, of opposing the outward thrust exerted on each ball at one contact face of a bearing member by an inward thrust at the other contact point of said bearing member, these two thrusts being substantially radial for each bearing, as indicated by the radial lines, and equalized, for the purpose of centering the balls in the ball races under all conditions and in all positions of the bearing.

Coming now to the consideration of the multiple-thrust bearing illustrated, it will be seen that I have shown a plurality of circuits of balls coacting with corresponding bearing faces of bearing members exceeding by one the number of circuits of balls. All of these balls and bearing members are or may be similar to the upper or single bearing element just described. Preferably, the bearing faces for different circuits of balls are disposed differently, the disposition of these faces for one circuit being the opposite of that for the next succeeding circuit. Thus, the bearing member 1 has a wide groove or ball-race in the under side thereof and the bearing member 3 has a narrow groove or ball-race in its upper side; while in the next succeeding element of the multiple bearing the upper bearing member has a narrow groove 13 in its under side and the lower bearing member 5 has a wide groove or ball-race 12 in its upper side. In a similar manner the groove or ball-race in the under side of the bearing member 5 is a wide groove 12 and the groove in the upper side of the next and final bearing member 7 of the series is a narrow groove 13, the disposition of the wide and narrow grooves alternating throughout the multiple bearing. It will be noticed that each of the bearing members except the first and last has in this construction, which is the preferred one, bearing faces at opposite sides thereof, which bearing faces are similar, that is, the grooves or ball-races of each of these intermediate bearing members are like grooves; but the grooves of successive intermediate bearing members are dissimilar, the bearing member 3 having two narrow grooves and the bearing member 5 having two wide grooves. All of these grooves are, however, preferably identical in function with the grooves of the bearing members of the first element, which element has been fully described.

The balls of the second and third circuits shown are designated by 4 and 6, to distinguish them from the balls of the first circuit, and one bearing member of each element of the multiple bearing is adapted to rotate relatively to its coacting bearing member. Here, the uppermost bearing member 1 is fixed with respect to the shaft 10, and the lowermost bearing member 7 is fixed with respect to a thrust member or support 8 which is clear of the shaft 10, all of the bearing elements or members except the first being also clear of said shaft, to permit the shaft to turn freely without making contact with any of said members. The construction just described is such as to permit the subdivision of the work done by the different elements of the multiple thrust bearing in the following manner.

Assuming that the shaft 10 is rotated at a speed beyond the capacity of any single element of the multiple bearing, that is to say, beyond the capacity of any single circuit of balls to roll properly without sliding when the relative speed of one bearing member of such element of the multiple bearing is equal to the speed of said shaft, the first bearing member 1 will turn with the shaft until the limit of its rotation relative to the bearing member 3 is about reached, when the bearing member 3 will also begin to turn, and when the bearing member 3 has reached the limit of its rotation relative to the bearing member 5, the latter will also begin to turn. Thus, for example, if the shaft 10 is to be revolved at the rate of 15,000 revolutions per minute and the limit of speed for each single element of the multiple bearing is 5,000 revolutions, the bearing member 3 will begin to turn when the bearing member 1 has a movement relative thereto of 5,000 revolutions per minute, and the bearing member 5 will begin to move when the bearing member 3 has a movement of 5,000 revolutions per minute relative to the member 5, at which time the bearing member 1 will have a movement of 10,000 revolutions per minute relative to the member 5. The bearing member 5 will be speeded up until it reaches the limit of its movement, viz., 5,000 revolutions per minute relative to the fixed bearing member 7, at which time the bearing member 3 will be traveling at the rate of 10,000 revolutions and the bearing member 1 at the rate of 15,000 revolutions per minute. It will be clear, however, that the speed of the shaft is so distributed by the three elements or bearings of this multiple thrust-bearing that no element has a relative movement of more than 5,000 revolutions. Thus, each element of the multiple-thrust bearing is not taxed beyond its capacity, but instead, each lower element or individual bearing of the multiple thrust-bearing yields under the influence of a speed and thrust exceeding the capacity of the row of balls above it and begins to turn, the relative movements of the lowermost elements of the multiple thrust-bearing varying in accordance with the speed of the shaft.

All of the elements of my improved multiple thrust-bearing will maintain the positions shown when traveling at the highest speeds. I prefer, however, to provide in connection therewith ball-retaining means, such as the casing or sleeve 40, which is secured to one of the bearing members, preferably the bearing member 7, and is so constructed as to hold all of said members together endwise. Here the lowermost member 7 has a peripheral groove 7' into which the sleeve 40 is spun for the purpose of locking these two parts together. At its upper end this sleeve has an inturned flange 41 coacting with a beveled face 1' of the member 1 to hold the parts of the multiple bearing together. All of the bearing members except the lowermost one 7 are clear of the retaining-sleeve 40, and hence are free to turn relatively thereto and to one another, said sleeve serving however as the retaining means and also as the means for excluding dirt and other foreign substances from the bearing. All of the relatively-movable bearing members or rings are self-adjusting with respect to the balls, and the thrust applied to the bearing tends to force the various parts more firmly into the position shown and maintain them therein.

What I claim is:

1. The combination with opposed bearing members having a common axis of rotation about which one member is rotatable relative to the other, a circuit of balls between said members, one member having bearing portions which contact with said balls along the face of an imaginary cone, and the other member having bearing portions which contact with said balls along the face of a second imaginary cone, said cones having different angles at a common vertex.

2. The combination with opposed bearing members having a common axis of rotation about which one member is rotatable relative to the other, a circuit of balls between said members, one member having bearing portions which contact with said balls along the face of an imaginary cone, and the other member having bearing portions which contact with said balls along the face of a second imaginary cone within said first-mentioned imaginary cone, said cones having different angles at a common vertex.

3. In a ball-bearing and in combination, a bearing member having bearing portions lying in different planes relative to each other, a second bearing member having bearing portions lying in different planes relative to each other and to the bearing portions of said first named bearing members, a circuit of balls interposed between said bearing members and contacting with said bearing portions, in the faces of two imaginary cones having different angles at a common vertex.

4. In a ball-bearing and in combination, opposed bearing members having a plurality of bearing portions, each of said portions lying in a different plane relative to the others, and balls interposed between said members and contacting with said bearing portions in the faces of imaginary cones having different angles at a common vertex.

5. In a ball-bearing and in combination, opposed bearing members having bearing portions, the bearing portions of one member lying within the bearing portions of the other member, balls interposed between said members and contacting with said bearing portions in the faces of two imaginary cones, said cones having different angles at a common vertex.

6. In a ball-bearing and in combination, a plurality of opposed bearing members having alternately wide and narrow outwardly-flaring ball races in their proximate faces, the bearing portions in said races lying in different planes, and balls interposed between said members and contacting with said bearing portions in the faces of two imaginary cones having a common vertex.

7. In a ball bearing, a support, a rotatable shaft, a collar surrounding and rigid with the shaft and having a beveled outer edge, a collar surrounding the shaft and rigid with the support and of greater diameter than the collar rigid with the shaft, a collar surrounding the shaft and between and free from the two fixed collars, said collars provided with inner and outer annular bosses defining curved ball races in all the collars, said inner bosses spaced at less distance than the outer bosses, and balls of greater radius than the curvature of the ball races disposed within said races and to space the collars and a sleeve embracing the several collars and rigid at one end with the collar rigid with the support, and having at the other end an inturned flange embracing and spaced from the beveled side of the collar rigid with the shaft.

Signed at Auburn in the county of Cayuga and State of New York this first day of February A. D. 1904.

HENRY LA CASSE.

Witnesses:
A. L. HEMINGWAY,
RAY P. MEAKER.